L. Miller.
Harvester Cutter.
No. 778
Reissued. July 19 1859
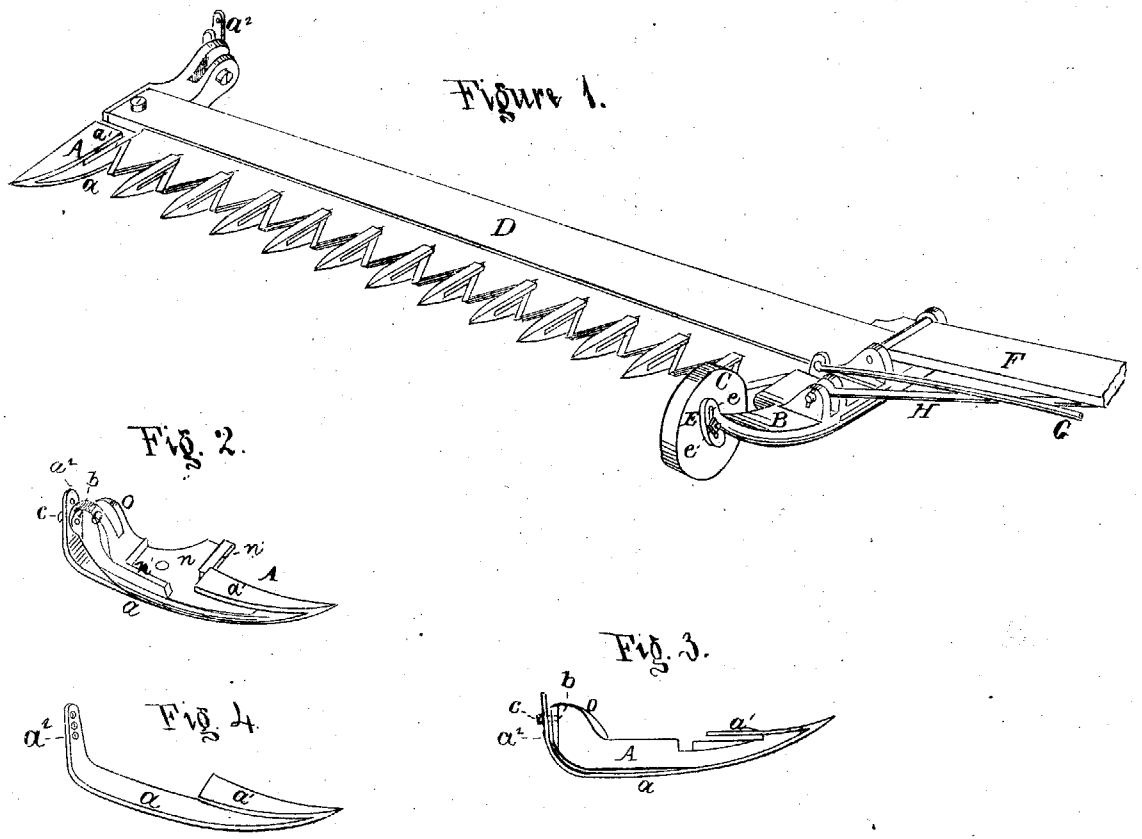

UNITED STATES PATENT OFFICE.

C. AULTMAN & CO., ASSIGNEES OF LEWIS MILLER, OF CANTON, OHIO.

IMPROVEMENT IN HARVESTERS.

Specification forming part of Letters Patent No. 20,181, dated May 4, 1858; Reissue No. 778, dated July 19, 1859.

DIVISION B.

*To all whom it may concern:*

Be it known that I, LEWIS MILLER, of Canton, in the county of Stark and State of Ohio, have invented certain new and useful Improvements in Harvesting-Machines, of which the following is a full, clear, and exact description, reference being had to the accompanying drawings, which make part of this specification, and in which—

Figure 1 represents in perspective certain parts of a machine for mowing embracing my improvements. Fig. 2 represents in perspective the right or outside shoe with its adjustable sole. Fig. 3 represents an elevation of the right side of the same, and Fig. 4 represents in perspective the sole of the same detached.

That end of the finger-beam which is connected to the main frame by the coupling-arm is called the "left" or "inner" end, and the opposite end is called the "right" or "outer" end.

In that class of machines for mowing in which the finger-beam is supported at each end on a shoe shaped somewhat like a sled-runner, the shoe at the outer end of the finger-beam has been made with an adjustable sole, by means of which that end of the finger-beam might be raised and lowered. In one case the sole has been made of a rigid bar slightly curving at the bottom, and at its front end turned up like a sled-runner, and connected by a joint to the under side of the shoe near its point, the rear end of the sole being raised and lowered by a set-screw. In another case the sole was made of a spring-bar fastened at the front end to the under side of the point of the shoe, and at its rear end connected with the heel of the shoe by means of a slotted link and a clamp-screw, the elasticity of the sole permitting its rear end to be raised and lowered and the link and screw fixing it in whatever position it might be set. In both these cases the rear end of the shoe projected out like a horn, and nearly horizontal when the finger-beam was set at the highest point and consequently was very liable to run into the ground when the machine was backed, especially if backed against a small elevation or rising surface, such as are numerous in nearly all meadows, either from natural inequalities of the surface or from artificial undulations produced by ridging the ground. The hinge of the link to the sole in the one case and the hinge of the sole to the shoe in the other necessarily had openings in the joints, in which grass was very liable to become entangled and to accumulate in a quantity sufficient to interfere with the function of dividing the stalks to be cut from those to be left standing, which is performed by the upper portion of the shoe, which for that purpose is made in the form of a pointed wedge.

For the purpose of obviating the beforementioned defects in this class of shoes and otherwise to secure advantages which they do not possess, I have devised the improvements herein claimed, which consist in making an adjustable sole in the form of a double sled-runner, turning it up in rear as well as in front, so that it may be moved backward with as little liability to run into the ground as when moving forward, and constructing its rear end so that it may be connected with the rear of the shoe, in various positions, by means of a set-screw, for the purpose of adjustment; and, to further carry out the idea of avoiding joints in the shoe for grass to catch and accumulate on, I extend the forward end of the sole and bend it round and over the point of the shoe backward, like the barb of a fish-hook, and secure it, when thus extended and shaped, firmly to the point of the shoe, the barb-like projection forming the shield or cap which is necessary for the protection of the cutter.

In the accompanying drawings, A represents the outer shoe. It is fitted with a seat, *n*, and flanges *n′ n′*, to secure it firmly to the end of the finger-beam, and with a pair of lugs, *o o*, for hinging a track-clearer to, and with another lug, *b*, fitted with a clamp-screw, *c*, that passes through any one of a series of holes in the rear end, $a^2$, of the sole, to fasten it to the rear end of the shoe in any position in which it may be adjusted to place the end of the finger-beam at the required height from the ground.

The bottom *a* of the sole is slightly curved, and it rises upward at its front end much less abruptly than at its rear end, that it may rise upon and pass over hillocks or like obstacles more freely when going forward.

The sole should be stiffest and broadest at its bottom *a* and more flexible at its forward end, near its point of attachment to the under side of the shoe, to facilitate adjustment.

At the point of junction of the barb *a'* with the lower part of the shoe the metal should be thicker and stronger, to protect it from being injured by collision with stones and other obstructions it may happen to encounter.

What I claim under this patent as my invention is—

The combination, with the shoe, of an adjustable sole of the peculiar double-runner form herein described, whereby the sole can be adjusted directly to the heel of the shoe without the intervention of a link-rod and joint, as herein set forth.

In testimony whereof I have hereunto subscribed my name.

LEWIS MILLER.

Witnesses:
S. HAWKES,
DANL. TONNER.